United States Patent
Furukawa et al.

(10) Patent No.: US 9,712,096 B2
(45) Date of Patent: Jul. 18, 2017

(54) CONTROL APPARATUS AND CONTROL METHOD FOR AC ROTARY MACHINE, AND ELECTRIC POWER STEERING APPARATUS

(71) Applicant: Mitsubishi Electric Corporation, Tokyo (JP)

(72) Inventors: Akira Furukawa, Tokyo (JP); Isao Kezobo, Tokyo (JP); Tatsuya Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/124,727

(22) PCT Filed: Apr. 28, 2014

(86) PCT No.: PCT/JP2014/061854
§ 371 (c)(1),
(2) Date: Sep. 9, 2016

(87) PCT Pub. No.: WO2015/166528
PCT Pub. Date: Nov. 5, 2015

(65) Prior Publication Data
US 2017/0019048 A1    Jan. 19, 2017

(51) Int. Cl.
*H02P 21/00*    (2016.01)
*H02P 21/05*    (2006.01)
(Continued)

(52) U.S. Cl.
CPC .............. *H02P 21/05* (2013.01); *B62D 5/046* (2013.01); *H02P 6/10* (2013.01); *H02P 21/08* (2013.01); *H02P 25/22* (2013.01); *H02P 27/08* (2013.01)

(58) Field of Classification Search
CPC ............ H02P 21/05; H02P 6/10; B62D 5/046
(Continued)

(56) References Cited

U.S. PATENT DOCUMENTS

2013/0285591 A1    10/2013  Suzuki
2015/0145462 A1*   5/2015   Ulrich .................. H02M 5/458
                                                        318/503
(Continued)

FOREIGN PATENT DOCUMENTS

JP         6-153569 A      5/1994
JP         2614788 B2      5/1997
(Continued)

OTHER PUBLICATIONS

International Search Report of PCT/JP2014/061854, dated Jul. 15, 2014. [PCT/ISA/210].

*Primary Examiner* — Erick Glass
(74) *Attorney, Agent, or Firm* — Sughrue Mion, PLLC; Richard C. Turner

(57) ABSTRACT

This invention is concerning obtaining a control apparatus and a control method for an AC rotary machine, with which a voltage command can be used up to a saturation voltage in each group of windings even when dimension differences exist between the groups of windings. A voltage saturation determination unit determines whether or not voltage saturation has occurred in a first winding group or a second winding group on the basis of at least one of a voltage and a current relating to the first winding group and the second winding group, and when determination is made that voltage saturation has occurred in either the first winding group or the second winding group, generates a voltage saturation determination signal for reducing a gain of at least one axial direction component on a rotational two-axis coordinate system.

18 Claims, 10 Drawing Sheets

(51) Int. Cl.
 B62D 5/04 (2006.01)
 H02P 6/10 (2006.01)
 H02P 27/08 (2006.01)
 H02P 25/22 (2006.01)
 H02P 21/08 (2016.01)

(58) Field of Classification Search
 USPC .................................................. 318/400.02
 See application file for complete search history.

(56) References Cited

U.S. PATENT DOCUMENTS

2015/0311894 A1* 10/2015 McIntosh ........... H03K 17/6871
 318/504
2016/0204726 A1* 7/2016 Mori ....................... H02P 21/22
 318/400.02

FOREIGN PATENT DOCUMENTS

| | | |
|---|---|---|
| JP | 10-262399 A | 9/1998 |
| JP | 2008-67582 A | 3/2008 |
| JP | 2013-230019 A | 11/2013 |
| JP | 2014-3765 A | 1/2014 |

\* cited by examiner

FIG. 11
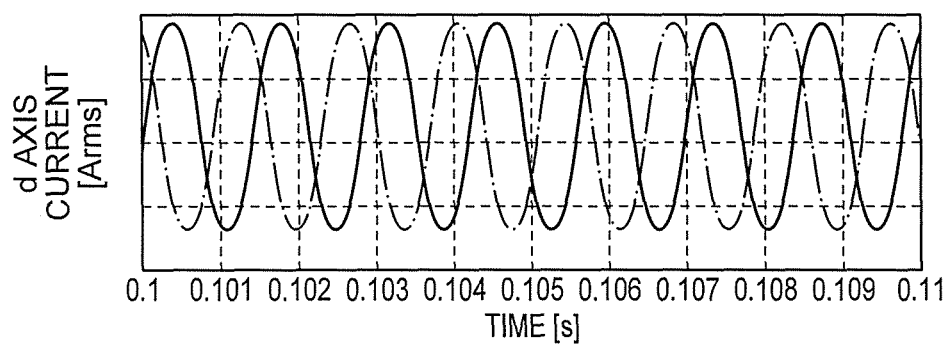
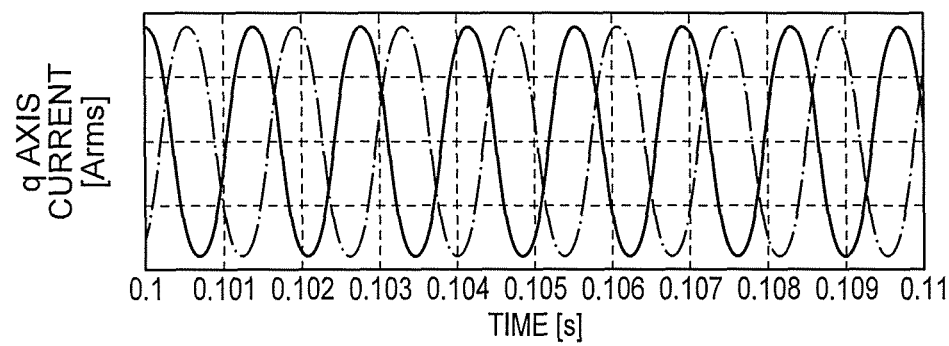
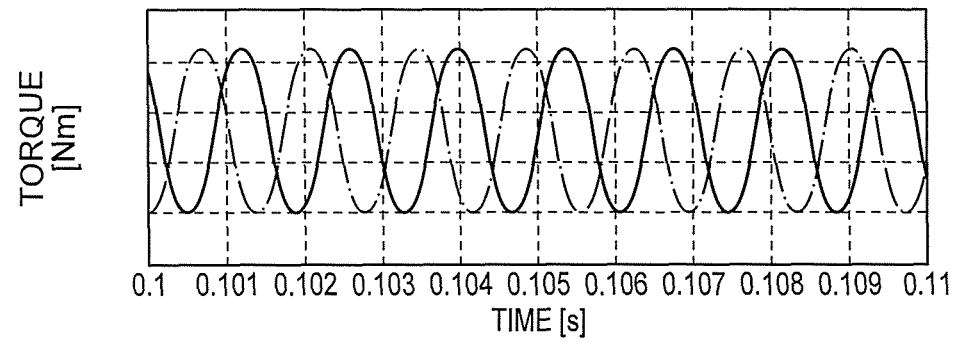

CONTROL APPARATUS AND CONTROL METHOD FOR AC ROTARY MACHINE, AND ELECTRIC POWER STEERING APPARATUS

CROSS REFERENCE TO RELATED APPLICATIONS

This application is a National Stage of International Application No. PCT/JP2014/061854 filed Apr. 28, 2014, the contents of all of which are incorporated herein by reference in their entirety.

TECHNICAL FIELD

This invention relates to a control apparatus and a control method for an AC rotary machine having a plurality of groups of windings, and an electric power steering apparatus that includes the control apparatus for an AC rotary machine.

BACKGROUND ART

It is known in the prior art that when mutual inductance exists between groups of windings in an AC rotary machine having a plurality of groups of windings, currents of the respective groups of windings are affected by the currents of the other groups of windings, leading to an increase in the likelihood of current, voltage, and torque oscillation.

Hence, an AC motor control apparatus that includes a plurality of inverters and suppresses interference caused by mutual inductance between a plurality of groups of windings (i.e. realizes non-interference) by controlling an average current and a differential current of the respective inverters has been proposed (see PTL 1, for example).

More specifically, in this AC motor control apparatus, a current imbalance is reduced by determining an average voltage command on the basis of a deviation between an average value (an average current) of respective output currents of the inverters and an average current command in a rotational two-axis coordinate system, determining a differential voltage command on the basis of a deviation between a difference (a differential current) between the respective output currents of the inverters and a differential current command, returning the average voltage command and the differential voltage command to voltage commands for the respective groups of windings, and outputting the commands.

A control apparatus for a three-phase rotary machine that includes a plurality of inverters and prevents an overcurrent from flowing through a system that is operating normally when one system breaks down so that a current cannot be passed therethrough by controlling a control gain ratio between a sum current and a differential current of the respective inverters in accordance with a reference frequency has also been proposed (see PTL 2, for example).

CITATION LIST

Patent Literature

[PTL 1]
Japanese Patent Publication No. 2614788
[PTL 2]
Japanese Patent Application Publication No. 2013-230019

SUMMARY OF INVENTION

Technical Problem

However, the prior art includes the following problems. The AC motor control apparatus described in PTL 1 realizes non-interference by controlling the average current and the differential current of the respective inverters. Note that when dimensions of the plurality of groups of windings are perfectly identical, the voltage commands required to output equal currents are also identical, but in actuality, dimension differences exist between the groups of windings due to manufacturing irregularities and the like.

Here, in a high load/high rotation region where voltage saturation occurs frequently, a voltage command difference required to output equal currents increases. When the voltage command difference is large, a differential voltage command vector obtained by feeding back the differential current increases. However, the voltage command that can be output is limited by a power supply voltage, and therefore the voltage command vector is limited to a vector that can be realized within the saturation voltage. In other words, even when the differential voltage command vector is a vector with two degrees of freedom, the direction thereof changes once the vector is projected onto a saturation voltage circle.

Further, when the differential current is controlled to a target value, the voltage command cannot be used up to the saturation voltage in one of the groups due to the dimension differences. Hence, the groups in which the voltage command can be used up to the saturation voltage are limited by the dimension differences, leading to a reduction in output torque.

Note that even when a phase difference is provided between the output currents so that a torque ripple can be reduced, one group is saturated while the other group remains unsaturated, and therefore an effect for cancelling out the torque ripple using the phase difference cannot be obtained. During use in an electric power steering apparatus, for example, noise propagating through a steering system may increase and the steering feeling may deteriorate.

Furthermore, when a limitation is applied using a saturation voltage circle alone during commonly employed proportional integral control, a control integration term of the differential current increases to an excessively large value. When this condition remains established continuously at this time such that the control becomes unstable, phenomena such as strong oscillation and vibration occur. For example, when a user requests a large amount of torque in a condition where the voltage is saturated during use an electric power steering apparatus, strong oscillation and vibration occur, and as a result, steering cannot be performed normally.

Moreover, the control apparatus for the three-phase rotary machine described in PTL 2 prevents an overcurrent from flowing through the system that is operating normally by controlling the control gain ratio between the sum current and the differential current of the respective inverters in accordance with the reference frequency. In PTL 2, no measures are taken to deal with a reduction in output torque during a normal operation due to dimension differences. Further, when the gain of the differential current is reduced, a current ripple increases between the respective groups of windings.

Note that voltage saturation occurs at different rotation speeds depending on whether the current command is large or small, and therefore, when the gain of the differential current is reduced in accordance with the rotation speed while the voltage is not saturated, the gain of the differential current decreases, leading to an increase in the current ripple in a low output/high rotation region. Hence, during use in an electric power steering apparatus, for example, noise propagating through the steering system may increase and the steering feeling may deteriorate.

This invention has been designed to solve the problems described above, and an object thereof is to obtain a control apparatus and a control method for an AC rotary machine, with which a voltage command can be used up to a saturation voltage in each group of windings even when dimension differences exist between the groups of windings.

Solution to Problem

A control apparatus for an AC rotary machine according to this invention controls an AC rotary machine having a first winding group and a second winding group, and includes: a current detection unit that detects a current flowing through the first winding group and a current flowing through the second winding group; a sum voltage calculation unit that calculates a sum voltage on a rotational two-axis coordinate system on the basis of a sum current, which is a sum of the current of the first winding group and the current of the second winding group, and a current command for the AC rotary machine; a differential voltage calculation unit that calculates a differential voltage on the rotational two-axis coordinate system on the basis of a differential current, which is a difference between the current of the first winding group and the current of the second winding group; a first voltage calculation unit that calculates a voltage command for the first winding group on the basis of a sum of the sum voltage and the differential voltage; a second voltage calculation unit that calculates a voltage command for the second winding group on the basis of a difference between the sum voltage and the differential voltage; and a voltage saturation determination unit that determines whether or not voltage saturation has occurred in the first winding group or the second winding group on the basis of at least one of a voltage and a current relating to the first winding group and the second winding group, and having determined that voltage saturation has occurred in the first winding group or the second winding group, generates a voltage saturation determination signal for reducing a gain of at least one axial direction component on the rotational two-axis coordinate system.

Further, a control method for an AC rotary machine according to this invention is used to control an AC rotary machine having a first winding group and a second winding group, and includes: a current detection step of detecting a current flowing through the first winding group and a current flowing through the second winding group; a sum voltage calculation step of calculating a sum voltage on a rotational two-axis coordinate system on the basis of a sum current, which is a sum of the current of the first winding group and the current of the second winding group, and a current command for the AC rotary machine; a differential voltage calculation step of calculating a differential voltage on the rotational two-axis coordinate system on the basis of a differential current, which is a difference between the current of the first winding group and the current of the second winding group; a first voltage calculation step of calculating a voltage command for the first winding group on the basis of a sum of the sum voltage and the differential voltage; a second voltage calculation step of calculating a voltage command for the second winding group on the basis of a difference between the sum voltage and the differential voltage; and a voltage saturation determination step of determining whether or not voltage saturation has occurred in the first winding group or the second winding group on the basis of at least one of a voltage and a current relating to the first winding group and the second winding group, and when voltage saturation is determined to have occurred in the first winding group or the second winding group, generating a voltage saturation determination signal in order to reduce a gain of at least one axial direction component on the rotational two-axis coordinate system.

Advantageous Effects of Invention

In the control apparatus and control method for an AC rotary machine according to this invention, the voltage saturation determination unit determines whether or not voltage saturation has occurred in the first winding group or the second winding group on the basis of at least one of the voltages and the currents relating to the first winding group and the second winding group, and having determined that voltage saturation has occurred in the first winding group or the second winding group, generates the voltage saturation determination signal for reducing the gain of at least one axial direction component on the rotational two-axis coordinate system.

It is therefore possible to obtain a control apparatus and a control method for an AC rotary machine with which a voltage command can be used up to a saturation voltage in each group of windings even when dimension differences exist between the groups of windings.

BRIEF DESCRIPTION OF DRAWINGS

FIG. 9

FIG. 11 is an illustrative view showing examples of the currents and the torque when the phase difference between the first winding group and the second winding group is set at 22.5° in the control apparatus for an AC rotary machine according to Embodiment 5 of this invention.

DESCRIPTION OF EMBODIMENTS

Figure 1:
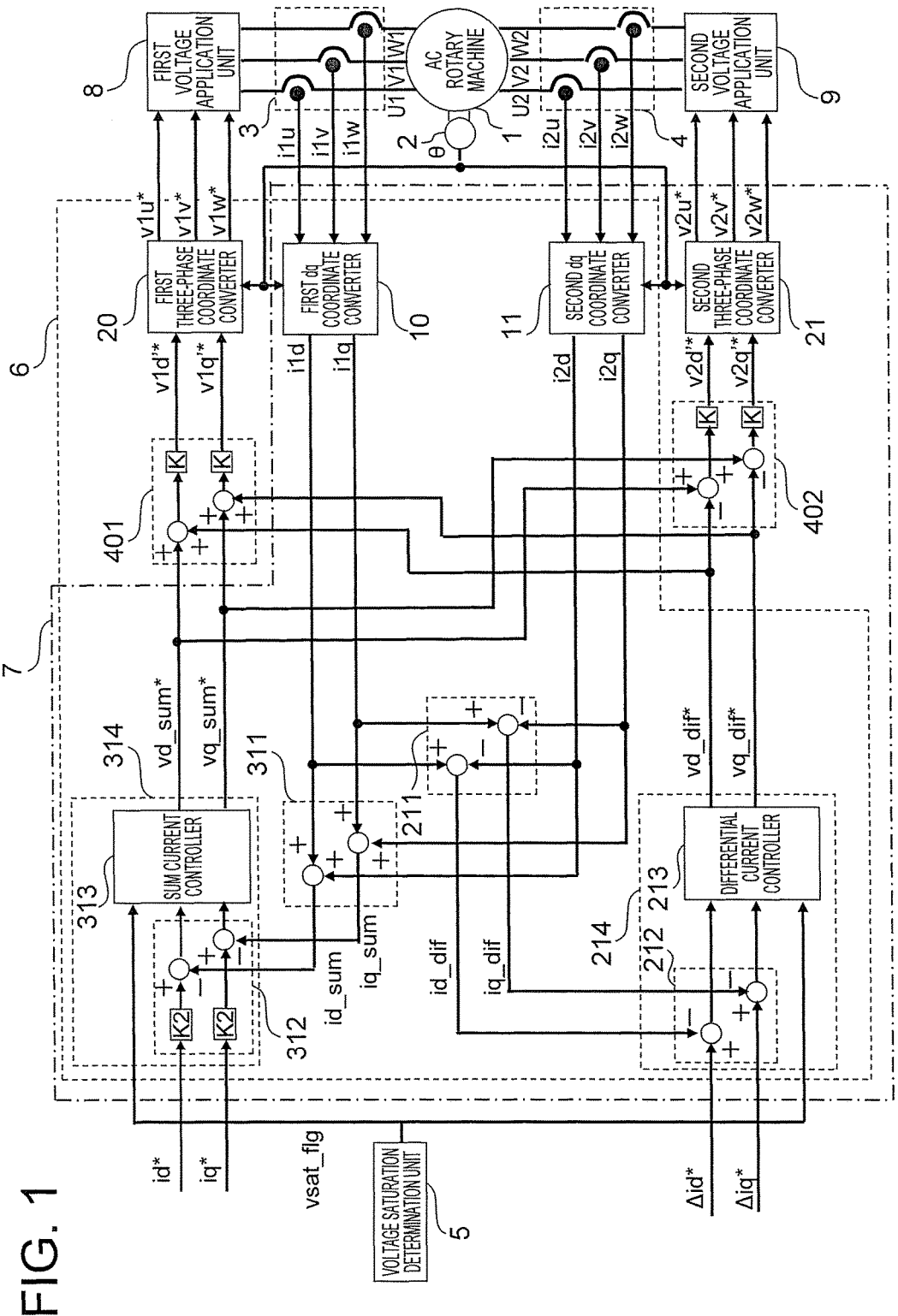
FIG. 1 is a view showing a configuration of a control apparatus for an AC rotary machine according to Embodiment 1 of this invention, together with an AC rotary machine.

Preferred embodiments of a control apparatus and a control method for an AC rotary machine and an electric power steering apparatus according to this invention will be described below using the drawings. Identical or corresponding parts of the drawings will be described using identical reference numerals.

Embodiment 1

FIG. 1 is a view showing a configuration of a control apparatus for an AC rotary machine according to Embodiment 1 of this invention, together with an AC rotary machine.

Note that in this embodiment, a permanent magnet type synchronous rotary machine having two groups of windings will be described as an example of an AC rotary machine 1, but this invention is not limited thereto, and may be applied to any permanent magnet type synchronous rotary machine or field winding type synchronous rotary machine having two or more groups of windings.

Further, in FIG. 1, the control apparatus for this AC rotary machine includes a position detection unit 2, a first current detection unit 3, a second current detection unit 4, a voltage saturation determination unit 5, a first voltage calculation unit 6, a second voltage calculation unit 7, a first voltage application unit 8, and a second voltage application unit 9.

The position detection unit 2 uses a position detector such as a Hall element, a resolver, or an encoder to detect a rotation position θ of the AC rotary machine 1. Note that instead of providing the position detection unit 2, the rotation position θ of the AC rotary machine 1 may be estimated on the basis of respective currents of a first winding group and a second winding group, detected respectively by the first current detection unit 3 and the second current detection unit 4, or the like.

The first current detection unit 3 uses a current detector such as a shunt resistor or a Hall element to detect currents i1u, i1v, i1w flowing through a first winding group U1, V1, W1 of the AC rotary machine 1. Further, the second current detection unit 4 uses a current detector such as a shunt resistor or a Hall element to detect currents i2u, i2v, i2w flowing through a second winding group U2, V2, W2 of the AC rotary machine 1. The voltage saturation determination unit 5 generates a voltage saturation determination signal vsat_flg indicating whether or not voltage saturation has occurred in the first winding group or the second winding group using a voltage or a current.

The first voltage calculation unit 6 calculates voltage commands v1u*, v1v*, v1w* for the first winding group on the basis of current commands id*, iq*, differential current commands Δid*, Δiq*, the currents i1u, i1v, i1w of the first winding group, detected by the first current detection unit 3, the currents i2u, i2v, i2w of the second winding group, detected by the second current detection unit 4, and the voltage saturation determination signal vsat_flg generated by the voltage saturation determination unit 5.

The second voltage calculation unit 7 calculates voltage commands v2u*, v2v*, v2w* for the second winding group on the basis of the current commands id*, iq*, the differential current commands Δid*, Δiq*, the currents i1u, i1v, i1w of the first winding group, detected by the first current detection unit 3, the currents i2u, i2v, i2w of the second winding group, detected by the second current detection unit 4, and the voltage saturation determination signal vsat_flg generated by the voltage saturation determination unit 5.

The first voltage application unit 8 uses a power converter such as an inverter or a matrix converter to apply voltages to the first winding group U1, V1, W1 of the AC rotary machine 1 by modulating the voltage commands v1u*, v1v*, v1w* for the first winding group by means of an existing technique such as PWM or PAM.

The second voltage application unit 9 uses a power converter such as an inverter or a matrix converter to apply voltages to the second winding group U2, V2, W2 of the AC rotary machine 1 by modulating the voltage commands v2u*, v2v*, v2w* for the second winding group by means of an existing technique such as PWM or PAM.

Next, configurations and functions of the first voltage calculation unit 6 and the second voltage calculation unit 7 will be described in detail. The first voltage calculation unit 6 includes a first dq coordinate converter 10, a second dq coordinate converter 11, a first three-phase coordinate converter 20, a differential current calculator 211, a differential voltage calculation unit 214 constituted by a subtractor 212 and a differential current controller 213, a sum current calculator 311, a sum voltage calculation unit 314 constituted by a subtractor 312 and a sum current controller 313, and an adder 401. The second voltage calculation unit 7 includes the first dq coordinate converter 10, the second dq coordinate converter 11, a second three-phase coordinate converter 21, the differential current calculator 211, the differential voltage calculation unit 214 constituted by the subtractor 212 and the differential current controller 213, the sum current calculator 311, the sum voltage calculation unit 314 constituted by the subtractor 312 and the sum current controller 313, and a subtractor 402.

The first dq coordinate converter 10 calculates currents i1d, i1q on two rotary axes (a d-q axis) on the basis of the currents i1u, i1v, i1w of the first winding group, detected by the first current detection unit 3 and the rotation position θ detected by the position detection unit 2.

The second dq coordinate converter 11 calculates currents i2d, i2q on the two rotary axes (the d-q axis) on the basis of the currents i2u, i2v, i2w of the second winding group, detected by the second current detection unit 4 and the rotation position θ detected by the position detection unit 2.

The differential current calculator 211 calculates differential currents, which are differences between the currents of the first winding group and the currents of the second winding group. More specifically, the differential current calculator 211 calculates differential currents id_dif, iq_dif serving as the differences between the currents of the first winding group and the currents of the second winding group by subtracting the currents i2d, i2q of the second winding group, calculated by the second dq coordinate converter 11, respectively from the currents i1d, i1q of the first winding group, calculated by the first dq coordinate converter 10.

The subtractor 212 calculates deviations did_dif, diq_dif by subtracting the differential currents id_dif, iq_dif calculated by the differential current calculator 211 respectively from the differential current commands Δid*, Δiq*. Note that in this embodiment, a case in which the differential current commands Δid*, Δiq* are set at zero will be described, but the differential current commands Δid*, Δiq* may be set at values other than zero.

The current controller 213 calculates differential voltages vd_dif*, vq_dif* on the two rotary axes (the d-q axis) by performing proportional integral control or proportional control using a control gain determined from the voltage saturation determination signal vsat_flg so that the deviations did_dif, diq_dif calculated by the subtractor 212 are both aligned with zero.

In other words, the differential voltage calculation unit 214 calculates the differential voltages vd_dif*, vq_dif* on the two rotary axes (the d-q axis) on the basis of the differential currents id_dif, iq_dif serving as the differences between the currents of the first winding group and the currents of the second winding group, the differential current commands Δid*, Δiq*, and the voltage saturation determination signal vsat_flg.

The sum current calculator 311 calculates sum currents serving as sums of the currents of the first winding group and the currents of the second winding group. More specifically, the sum current calculator 311 calculates sum currents id_sum, iq_sum serving as the sums of the currents of the first winding group and the currents of the second winding group by adding the currents i1d, i1q of the first winding group, calculated by the first dq coordinate converter 10, respectively to the currents i2d, i2q of the second winding group, calculated by the second dq coordinate converter 11.

The subtractor 312 calculates deviations did_sum, diq_sum by subtracting the sum currents id_sum, iq_sum calculated by the sum current calculator 311 respectively from values obtained by multiplying the current commands id*, by K2. Note that here, K2 is set at 2 (a constant).

The current controller 313 calculates sum voltages vd_sum*, vq_sum* on the two rotary axes (the d-q axis) by performing proportional integral control or proportional control using a control gain determined from the voltage saturation determination signal vsat_flg so that the deviations did_sum, diq_sum calculated by the subtractor 312 are both aligned with zero.

In other words, the sum voltage calculation unit 314 calculates the sum voltages vd_sum*, vq_sum* on the two rotary axes (the d-q axis) on the basis of the sum currents id_sum, iq_sum serving as the sums of the currents of the first winding group and the currents of the second winding group, the current commands id*, iq*, and the voltage saturation determination signal vsat_flg.

The adder 401 calculates a d axis voltage command v1d'* for the first winding group as a d axis component on the two rotary axes (the d-q axis) by adding together the sum voltage vd_sum* calculated by the current controller 313 and the differential voltage vd_dif* calculated by the current controller 213 and then multiplying the result by K, and calculates a q axis voltage command v1q'* for the first winding group as a q axis component by adding together the sum voltage vq_sum* calculated by the current controller 313 and the differential voltage vq_dif* calculated by the current controller 213 and then multiplying the result by K. Note that here, K is set at 0.5 (a constant).

The subtractor 402 calculates a d axis voltage command v2d'* for the second winding group as a d axis component on the two rotary axes (the d-q axis) by subtracting the differential voltage vd_dif* calculated by the current controller 213 from the sum voltage vd_sum* calculated by the current controller 313 and then multiplying the result by K, and calculates a q axis voltage command v2q'* for the second winding group as a q axis component by subtracting the differential voltage vq_dif* calculated by the current controller 213 from the sum voltage vq_sum* calculated by the current controller 313 and then multiplying the result by K.

Note that here, a case in which K2 is set at 2 and K is set at 0.5 will be described, but instead, a coefficient may be applied during the calculation process so that an average voltage rather than a sum voltage is obtained.

The first three-phase coordinate converter 20 calculates the voltage commands v1u*, v1v*, v1w* for the first winding group on the basis of the voltage commands v1d'*, v1q'* on the two rotary axes, calculated by the adder 401. The second three-phase coordinate converter 21 calculates the voltage commands v2u*, v2v*, v2w* for the second winding group on the basis of the voltage commands v2d'*, v2q'* on the two rotary axes, calculated by the subtractor 402.

Voltage vectors of the control apparatus for an AC rotary machine having the above configuration will be described below. First, when the d axis voltage and q axis voltage of the first winding group are set respectively at v1d and v1q and the d axis voltage and q axis voltage of the second winding group are set respectively at v2d and v2q, a relational expression between the voltage and the current in the AC rotary machine 1 is expressed by Equation (1), shown below.

[Expression 1]

$$\begin{bmatrix} v_{1d} \\ v_{1q} \\ v_{2d} \\ v_{2q} \end{bmatrix} = \begin{bmatrix} R+sL_d & -\omega L_q & sM_d & -\omega M_q \\ \omega L_d & R+sL_q & \omega M_d & sM_q \\ sM_d & -\omega M_q & R+sL_d & -\omega L_q \\ \omega M_d & sM_q & \omega L_d & R+sL_q \end{bmatrix} \begin{bmatrix} i_{1d} \\ i_{1q} \\ i_{2d} \\ i_{2q} \end{bmatrix} + \begin{bmatrix} 0 \\ \omega\phi \\ 0 \\ \omega\phi \end{bmatrix} \quad (1)$$

In Equation (1), s denotes a differential operator of a Laplace transform, R denotes a resistance, ω denotes an electric angular velocity, φ denotes magnetic flux, Ld denotes d axis self-inductance, Lq denotes q axis self-inductance, Md denotes d axis mutual inductance, and Mq denotes q axis mutual inductance.

Further, by transforming Equation (1), Equations (2) and (3), shown below, are obtained.

[Expression 2]

$$\begin{bmatrix} v_{1d}+v_{2d} \\ v_{1q}+v_{2q} \end{bmatrix} = \begin{bmatrix} R+s(L_d+M_d) & -\omega(L_q+M_q) \\ \omega(L_d+M_d) & R+s(L_q+M_q) \end{bmatrix} \begin{bmatrix} i_{1d}+i_{2d} \\ i_{1q}+i_{2q} \end{bmatrix} + \begin{bmatrix} 0 \\ 2\omega\phi \end{bmatrix} \quad (2)$$

[Expression 3]

$$\begin{bmatrix} v_{1d}-v_{2d} \\ v_{1q}-v_{2q} \end{bmatrix} = \begin{bmatrix} R+s(L_d-M_d) & -\omega(L_q-M_q) \\ \omega(L_d-M_d) & R+s(L_q-M_q) \end{bmatrix} \begin{bmatrix} i_{1d}-i_{2d} \\ i_{1q}-i_{2q} \end{bmatrix} + \begin{bmatrix} 0 \\ 0 \end{bmatrix} \quad (3)$$

Furthermore, a voltage equation in a case of a single three-phase rotary machine is expressed by Equation (4), shown below.

[Expression 4]

$$\begin{bmatrix} v_d \\ v_q \end{bmatrix} = \begin{bmatrix} R + sL_d & -\omega L_q \\ \omega L_d & R + sL_q \end{bmatrix} \begin{bmatrix} i_d \\ i_q \end{bmatrix} + \begin{bmatrix} 0 \\ \omega \phi \end{bmatrix} \quad (4)$$

Here, when Equation (2) and Equation (4) are compared, an equivalent to Equation (2) is obtained by replacing Ld and Lq in Equation (4) with Ld+Md and Lq+Mq, respectively, and doubling an induced voltage term. Similarly, when Equation (3) and Equation (4) are compared, an equivalent to Equation (3) is obtained by replacing Ld and Lq in Equation (4) with Ld−Md and Lq−Mq, respectively, and setting the induced voltage term at zero. Note that in PTL 1, non-interference is achieved in Equation (1) by performing control using the sum voltage of Equation (2) and the differential voltage of Equation (3).

Further, as shown below in Equation (5), the d axis voltage and the q axis voltage are limited in accordance with saturation voltages Vmax1 and Vmax2.

[Expression 5]

$$\begin{cases} v_{1d}^2 + v_{1q}^2 \leq V_{max1}^2 \\ v_{2d}^2 + v_{2q}^2 \leq V_{max2}^2 \end{cases} \quad (5)$$

More specifically, in the first winding group, the voltage commands $v1d'^*$, $v1q'^*$ on the two rotary axes, calculated by the adder 401, are limited in terms of actual output voltages by the saturation voltage Vmax1, as shown in Equation (5). Further, in the second winding group, the voltage commands $v2d'^*$, $v2q'^*$ on the two rotary axes, calculated by the subtractor 402, are limited in terms of actual output voltages by the saturation voltage Vmax2, as shown in Equation (5).

Note that in Equation (1), R, $\phi$, Ld, Lq, Md, and Mq are respectively set at equal values in the first winding group and the second winding group. In actuality, however, these dimensions differ between the first winding group and the second winding group due to factors such as manufacturing irregularities. A case in which only R differs between the first winding group and the second winding group such that equal voltages are supplied to the first winding group and the second winding group will be described below.

Furthermore, to simplify the description, it is assumed that Vmax1=Vmax2. However, this invention may be applied likewise to a case in which Vmax1≠Vmax2. Moreover, a case in which only R is different will be described below, but this invention may be applied likewise to a case in which the magnetic flux and the inductance differ between the first winding group and the second winding group.

In consideration of a steady state operation performed in a case where the resistance of the first winding group is set at R1 and the resistance of the second winding group is set at R2, the differential term in Equation (1) may be ignored, with the result that Equation (1) is expressed by Equation (6), shown below.

[Expression 6]

$$\begin{bmatrix} v_{1d} \\ v_{1q} \\ v_{2d} \\ v_{2q} \end{bmatrix} = \begin{bmatrix} R_1 & -\omega L_q & 0 & -\omega M_q \\ \omega L_d & R_1 & \omega M_d & 0 \\ 0 & -\omega M_q & R_2 & -\omega L_q \\ \omega M_d & 0 & \omega L_d & R_2 \end{bmatrix} \begin{bmatrix} i_{1d} \\ i_{1q} \\ i_{2d} \\ i_{2q} \end{bmatrix} + \begin{bmatrix} 0 \\ \omega \phi \\ 0 \\ \omega \phi \end{bmatrix} \quad (6)$$

Here, when the differential current commands Δid*, Δiq* are zero such that the first winding group and the second winding group can both be controlled normally, Equation (6) can be transformed into Equation (7), shown below.

[Expression 7]

$$\begin{bmatrix} v_{1d} \\ v_{1q} \\ v_{2d} \\ v_{2q} \end{bmatrix} = \begin{bmatrix} R_1 & -\omega L_q & 0 & -\omega M_q \\ \omega L_d & R_1 & \omega M_d & 0 \\ 0 & -\omega M_q & R_2 & -\omega L_q \\ \omega M_d & 0 & \omega L_d & R_2 \end{bmatrix} \begin{bmatrix} i_d^* \\ i_q^* \\ i_d^* \\ i_q^* \end{bmatrix} + \begin{bmatrix} 0 \\ \omega \phi \\ 0 \\ \omega \phi \end{bmatrix} \quad (7)$$

At this time, the sum currents and the differential currents are expressed by Equation (8), shown below.

[Expression 8]

$$\begin{bmatrix} v_{1d} + v_{2d} \\ v_{1q} + v_{2q} \\ v_{1d} - v_{2d} \\ v_{1q} - v_{2q} \end{bmatrix} = \quad (8)$$

$$\begin{bmatrix} R_1 & -\omega(L_q + M_q) & R_2 & -\omega(L_q + M_q) \\ \omega(L_d + M_d) & R_1 & \omega(L_d + M_d) & R_2 \\ R_1 & 0 & -R_2 & 0 \\ 0 & R_1 & 0 & -R_2 \end{bmatrix} \begin{bmatrix} i_d^* \\ i_q^* \\ i_d^* \\ i_q^* \end{bmatrix} +$$

$$\begin{bmatrix} 0 \\ 2\omega\phi \\ 0 \\ 0 \end{bmatrix}$$

Further, when the first winding group and the second winding group are controlled to identical current values, as shown in Equation (8), in an ideal condition where no dimension differences exist, Equation (9), shown below, is established.

[Expression 9]

$$\begin{cases} v_{1d} = v_{2d} \\ v_{1q} = v_{2q} \end{cases} \quad (9)$$

Due to the dimension difference (R1≠R2) between the two groups of windings, however, the first winding group and the second winding group have different voltage vectors. Therefore, when the voltage command is used up to the saturation voltage in the first winding group, for example, the voltage command can be used only up to a lower voltage than the saturation voltage in the second winding group due to the effect of the dimension difference.

Figure 2:
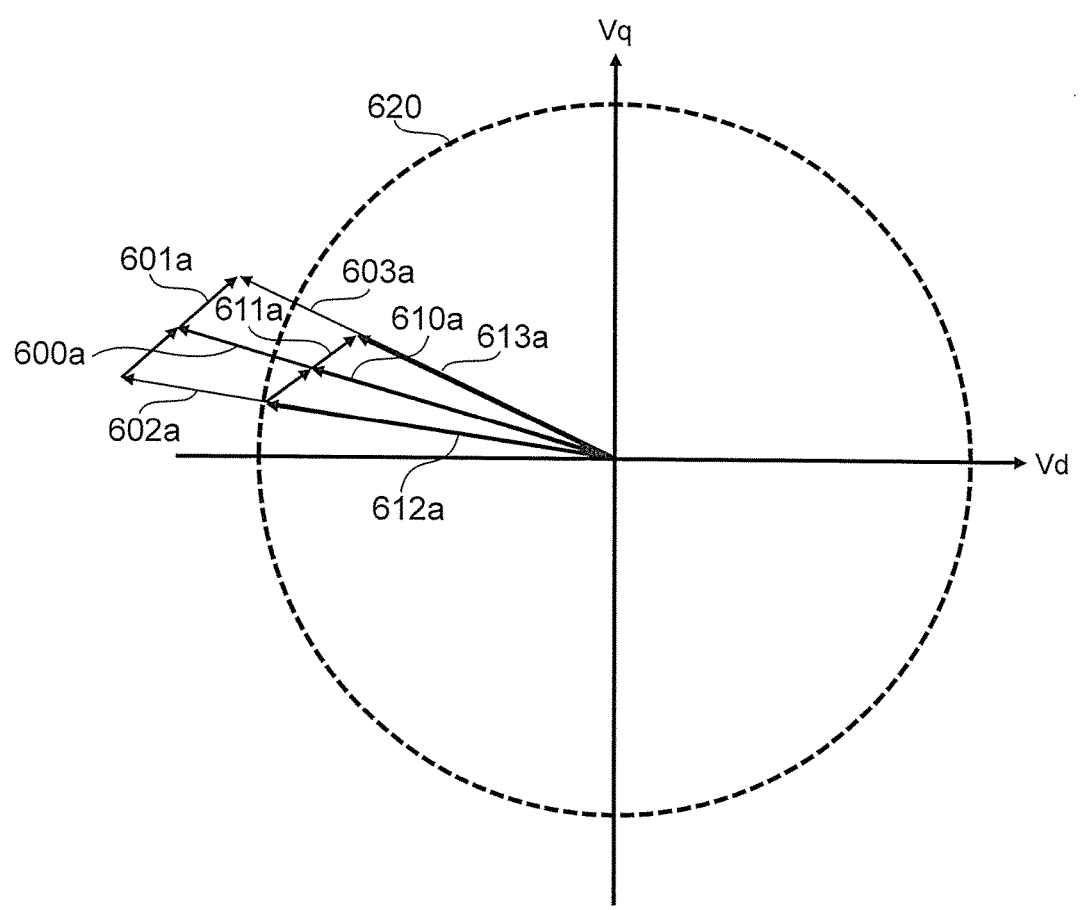
FIG. 2 is an illustrative view showing voltage vectors of respective groups of windings in a conventional AC motor control apparatus.

Here, when the difference between the respective current commands of the first winding group and the second winding group is controlled to the differential current command, as in PTL 1, the voltage vectors of the respective winding groups are as shown in FIG. 2. FIG. 2 is an illustrative view showing the voltage vectors of respective groups of windings in a conventional AC motor control apparatus.

In FIG. 2, a vector 600a is an average voltage vector obtained by halving a sum voltage vector obtained by proportional integral control or the like, a vector 601a is a voltage vector obtained by halving a differential voltage vector obtained by proportional integral control or the like, a vector 602a is a voltage vector of the first winding group in which voltage saturation is not taken into account, and a vector 603a is a voltage vector of the second winding group in which voltage saturation is not taken into account.

At this time, in actuality, the voltages are limited by a voltage saturation circle 620, and therefore the first winding group has a voltage vector 612a obtained by shortening the voltage vector 602a while the second winding group has a voltage vector 613a obtained by shortening the voltage vector 603a. In this case, the voltage vector 612a can make maximum use of the voltage saturation circle 620, but the voltage vector 613a is set such that leeway remains to the voltage saturation circle 620.

Hence, when the voltage is saturated in one winding group due to the effect of the dimension difference between the first winding group and the second winding group, the voltage command cannot be used up to the saturation voltage in the other winding group, leading to a reduction in output torque. Note that here, for simplicity, the two winding groups are described as having identical voltage saturation circles, but this invention may be applied likewise to a case in which the voltage saturation circles of the respective winding groups have different magnitudes.

Further, when the gain of the differential current is reduced in accordance with the rotation speed, as in PTL 2, a current ripple increases in a region where voltage saturation does not occur, such as a low output/high rotation region, for example, leading to an increase in noise propagating through the steering system.

In this embodiment, in response to these problems, the gain of the differential current is not reduced in a region where voltage saturation does not occur, and in a voltage saturation region where increased output torque is required, the output torque is maximized by reducing the gain of the d axis component of the differential current in a rotational two-axis coordinate system.

Figure 3:
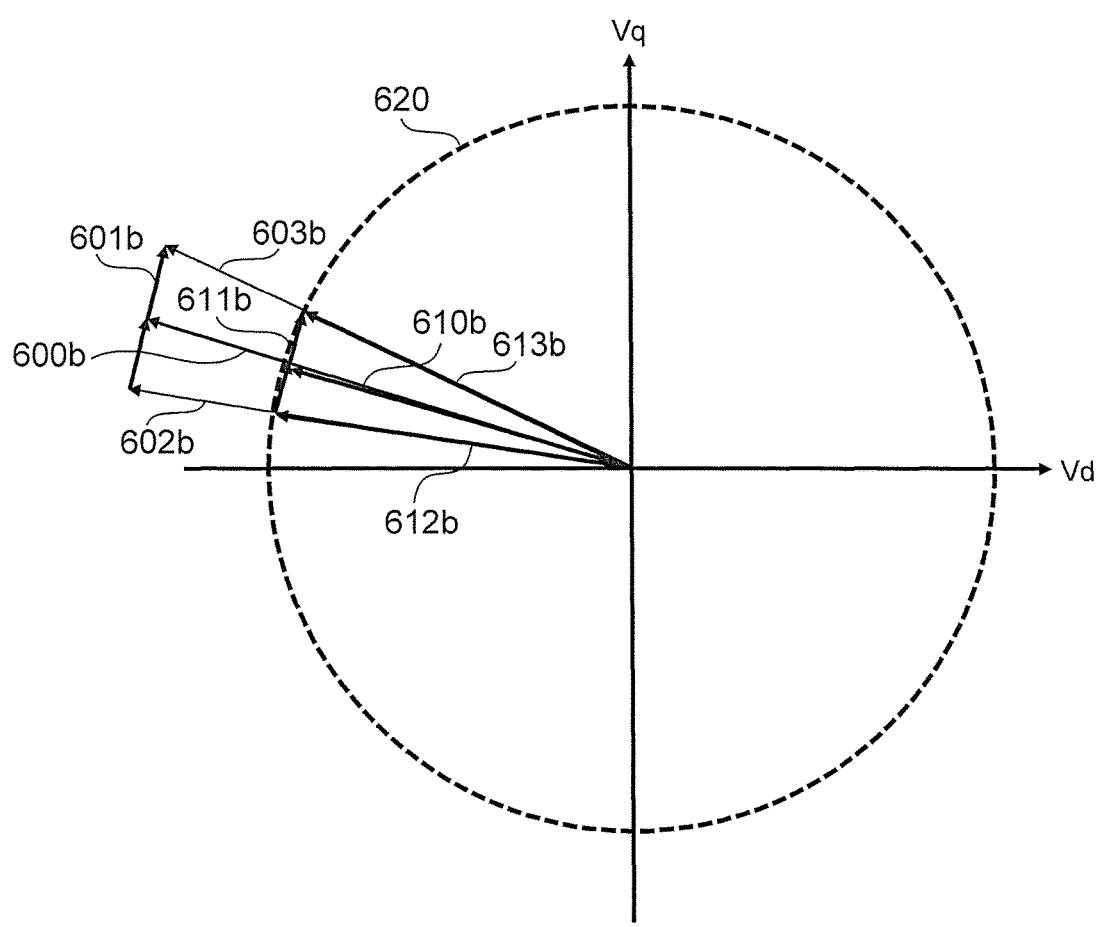
FIG. 3 is an illustrative view showing voltage vectors of respective groups of windings in the control apparatus for an AC rotary machine according to Embodiment 1 of this invention.

FIG. 3 is an illustrative view showing the voltage vectors of the respective groups of windings in the control apparatus for an AC rotary machine according to Embodiment 1 of this invention. In FIG. 3, a vector 600b is an average voltage vector obtained by halving a sum voltage vector obtained by proportional integral control or the like, a vector 601b is a voltage vector obtained by halving a differential voltage vector obtained by proportional integral control or the like, a vector 602b is a voltage vector of the first winding group in which voltage saturation is not taken into account, and a vector 603b is a voltage vector of the second winding group in which voltage saturation is not taken into account.

At this time, in actuality, the voltages are limited by the voltage saturation circle 620, and therefore the first winding group has a voltage vector 612b obtained by shortening the voltage vector 602b while the second winding group has a voltage vector 613b obtained by shortening the voltage vector 603b.

Here, the d axis component of the differential voltage is provided with a degree of freedom, and therefore the voltage vector 612b and the voltage vector 613b can both make maximum use of the voltage saturation circle 620. Hence, even when voltage saturation occurs in one of the winding groups due to the effect of the dimension difference between the first winding group and the second winding group, the voltage commands can be used up to the saturation voltage in both voltage groups, and as a result, the output torque can be increased.

According to Embodiment 1, as described above, the voltage saturation determination unit determines whether or not voltage saturation has occurred in the first winding group or the second winding group on the basis of at least one of the voltages and currents relating to the first winding group and the second winding group, and having determined that voltage saturation has occurred in the first winding group or the second winding group, generates the voltage saturation determination signal for reducing the gain of at least one axial direction component on the rotational two-axis coordinate system.

As a result, it is possible to obtain a control apparatus and a control method for an AC rotary machine with which a voltage command can be used up to a saturation voltage in each winding group even when a dimension difference exists between the winding groups.

Embodiment 2

In Embodiment 1, described above, the voltage saturation determination unit 5 simply generates the voltage saturation determination signal vsat_flag indicating whether or not voltage saturation has occurred in the first winding group or the second winding group using a voltage or a current.

Figure 4:
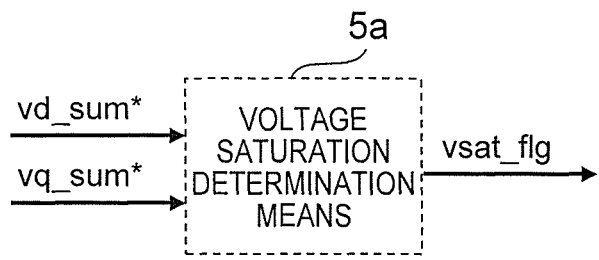
FIG. 4 is a view showing a configuration of a voltage saturation determination unit provided in a control apparatus for an AC rotary machine according to Embodiment 2 of this invention.

In Embodiment 2 of this invention, a case in which voltage saturation is determined using a voltage saturation determination unit 5a shown in FIG. 4 will be described. FIG. 4 is a view showing a configuration of the voltage saturation determination unit 5a provided in a control apparatus for an AC rotary machine according to Embodiment 2 of this invention.

First, assuming that a voltage difference between the first winding group and the second winding group is considerably smaller than the respective voltages thereof, Equation (10), shown below, is obtained by transforming Equation (5).

[Expression 10]

$$v_{max1}^2 + v_{max2}^2 \geq \frac{1}{2}\{(v_{1d}+v_{2d})^2+(v_{1q}+v_{2q})^2\} \qquad (10)$$

At this time, assuming that in Equation (10), a voltage corresponding to the voltage command can be output, Equation (10) is replaced by Equation (11), shown below.

[Expression 11]

$$v_{max1}^2 + v_{max2}^2 \geq \frac{1}{2}\{v^*_{d\_sum}{}^2 + v^*_{q\_sum}{}^2\} \qquad (11)$$

Here, the voltage saturation determination unit 5a switches the voltage saturation determination signal vsat_flg ON when the right side of Equation (11) equals or exceeds the left side, for example, and switches the voltage saturation determination signal vsat_flg OFF in all other cases. Hysteresis may be provided between an ON determination threshold and an OFF determination threshold to ensure that hunting does not occur in the voltage saturation determination signal vsat_flg.

Note, however, that the voltage saturation determination signal vsat_flg must be used to calculate the sum voltages vd_sum*, vq_sum*, and therefore previous values of the sum voltages vd_sum*, vq_sum* are preferably used to generate the voltage saturation determination signal vsat_flg.

By having the voltage saturation determination unit 5a generate the voltage saturation determination signal vsat_flg on the basis of the sum voltages in this manner, voltage saturation can be determined simply without checking the voltage saturation conditions of the respective groups.

Embodiment 3

Figure 5:
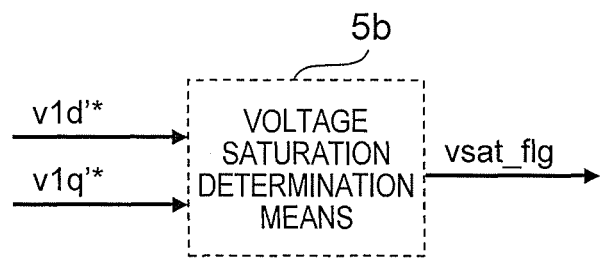
FIG. 5 is a view showing a configuration of a voltage saturation determination unit provided in a control apparatus for an AC rotary machine according to Embodiment 3 of this invention.

In Embodiment 2, described above, the voltage saturation determination unit 5a determines voltage saturation simply on the basis of the sum voltages. In Embodiment 3 of this invention, meanwhile, a case in which voltage saturation is determined using a voltage saturation determination unit 5b shown in FIG. 5 will be described. FIG. 5 is a view showing a configuration of the voltage saturation determination unit 5b provided in a control apparatus for an AC rotary machine according to Embodiment 3 of this invention.

The voltage saturation determination unit 5b generates the voltage saturation determination signal vsat_flg on the basis of the voltage commands v1d'*, v1q'* for the first winding group. Note that in this embodiment, voltage saturation is determined on the basis of the voltage commands for the first winding group alone, but voltage saturation may be determined on the basis of the voltage commands v2d'*, v2q'* for the second winding group alone, or on the basis of both the voltage commands for the first winding group and the voltage commands for the second winding group.

First, Equation (12), shown below, is obtained from Equation (5).

[Expression 12]

$$v'^{*2}_{1d}+v'^{*2}_{1q} \leq v_{max1}^2 \qquad (12)$$

Here, the voltage saturation determination unit 5b switches the voltage saturation determination signal vsat_flg ON when the left side of Equation (12) equals or exceeds the right side, for example, and switches the voltage saturation determination signal vsat_flg OFF in all other cases.

Note, however, that the voltage saturation determination signal vsat_flg must be used to calculate the voltage commands v1d'*, v1q'* for the first winding group, and therefore previous values of the voltage commands v1d'*, v1q'* for the first winding group are preferably used to generate the voltage saturation determination signal vsat_flg. Hysteresis may be provided between the ON determination threshold and the OFF determination threshold to ensure that hunting does not occur in the voltage saturation determination signal vsat_flg.

By having the voltage saturation determination unit 5b generate the voltage saturation determination signal vsat_flg on the basis of at least one of the voltage commands for the first winding group and the voltage commands for the second winding group in this manner, voltage saturation can be determined accurately through checking the voltage saturation conditions of the respective groups.

Embodiment 4

Figure 6:
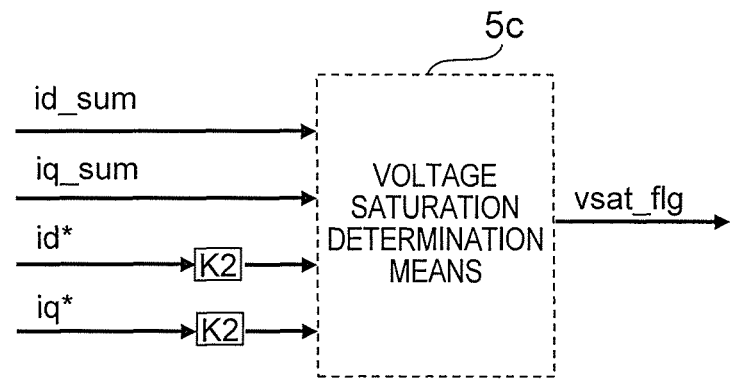
FIG. 6 is a view showing a configuration of a voltage saturation determination unit provided in a control apparatus for an AC rotary machine according to Embodiment 4 of this invention.

In Embodiment 2 and Embodiment 3, described above, voltage saturation is determined on the basis of the sum voltages and the voltage commands such as the voltage commands for the first winding group. In Embodiment 4 of this invention, meanwhile, a case in which voltage saturation is determined using a voltage saturation determination unit 5c shown in FIG. 6 will be described. FIG. 6 is a view showing a configuration of the voltage saturation determination unit 5c provided in a control apparatus for an AC rotary machine according to Embodiment 4 of this invention.

The voltage saturation determination unit 5c generates the voltage saturation determination signal vsat_flg on the basis of the sum currents id_sum, iq_sum and the current commands id*, iq*. Here, when voltage saturation occurs, the voltage cannot follow the current commands, and therefore a control expression shown in Equation (13), for example, may be employed.

[Expression 13]

$$(K_2 i^*_d - i_{d\_sum})^2 + (K_2 i^*_q - i_{q\_sum})^2 \geq \alpha \qquad (13)$$

Here, the voltage saturation determination unit 5c switches the voltage saturation determination signal vsat_flg ON when the left side of Equation (13) equals or exceeds the right side, for example, and switches the voltage saturation determination signal vsat_flg OFF in all other cases. Hysteresis may be provided between the ON determination threshold and the OFF determination threshold to ensure that hunting does not occur in the voltage saturation determination signal vsat_flg.

By having the voltage saturation determination unit 5c generate the voltage saturation determination signal vsat_flg on the basis of the sum currents and current commands in this manner, voltage saturation can be determined from most recent measured values rather than previous commands. Further, voltage saturation can be determined from a divergence between the detected currents and the current commands, and therefore a number of calculations using the voltage commands can be reduced.

Embodiment 5

Embodiment 5 of this invention differs from Embodiment 1 in that a phase difference is provided between the first winding group and the second winding group in order to cancel out a torque ripple of a sixth-order component of the electric angular velocity. This case will be described below.

Figure 7:
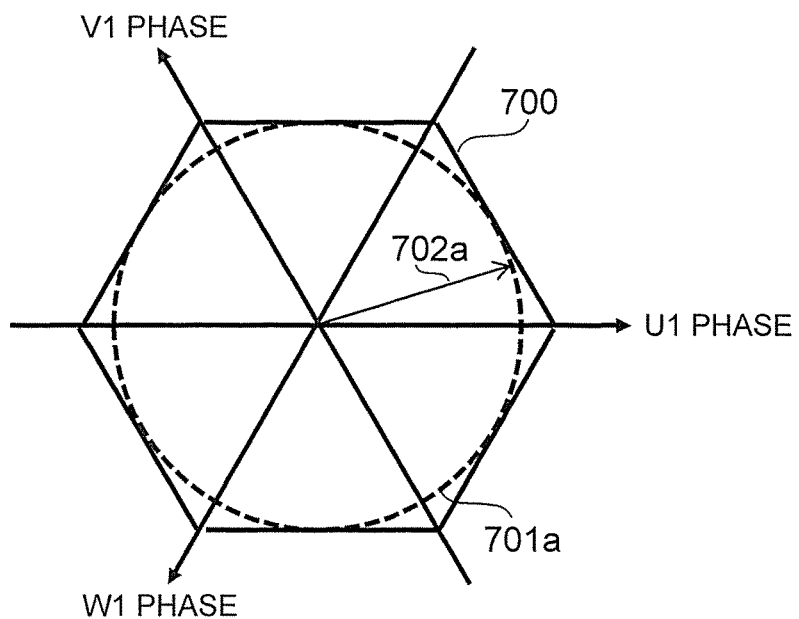
FIG. 7 is an illustrative view showing a range in which a voltage vector of a first winding group can be obtained in a control apparatus for an AC rotary machine according to Embodiment 5 of this invention.

FIG. 7 is an illustrative view showing a range in which the voltage vector of the first winding group can be obtained in a control apparatus for an AC rotary machine according to Embodiment 5 of this invention. In FIG. 7, voltage command ranges of respective phases are limited by the power supply voltage, and therefore the voltage vectors that can be set are limited to a range within a regular hexagon 700.

Further, when a voltage vector 702a that is accommodated within a circle 701a inscribed within the regular hexagon 700 is employed, an identical voltage vector can be output in all rotation positions. This condition is set as a modulation factor of 100%, and it is known that a voltage use rate can be improved with various modulation methods such as spatial vector modulation.

Figure 8:
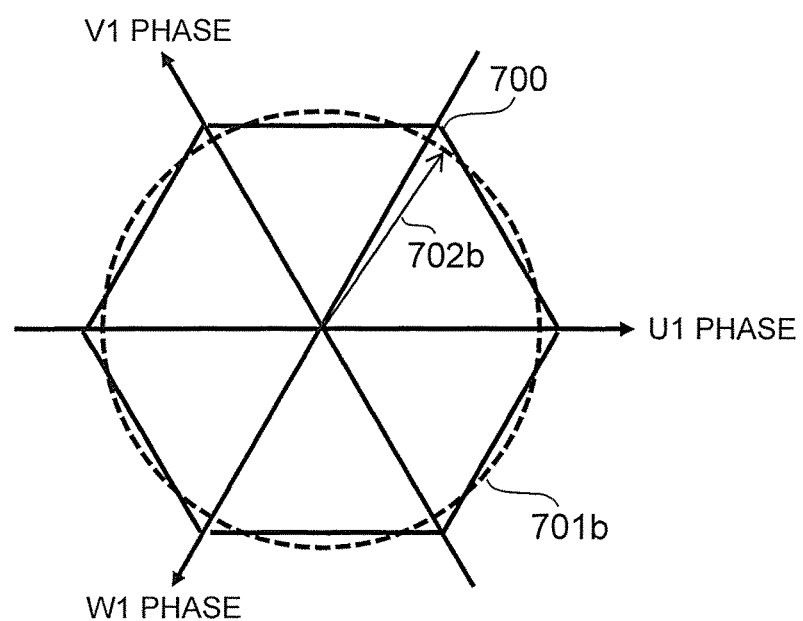
FIG. 8 is a different illustrative view showing the range in which the voltage vector of the first winding group can be obtained in the control apparatus for an AC rotary machine according to Embodiment 5 of this invention.

FIG. 8 is a different illustrative view showing the range in which the voltage vector of the first winding group can be obtained in the control apparatus for an AC rotary machine according to Embodiment 5 of this invention. When a voltage vector 702b determined in accordance with a circle 701b that exceeds the regular hexagon 700 at some angles in FIG. 8 is employed, the voltage vector 702b is limited to a range within the regular hexagon 700 at the angles exceeding the regular hexagon 700.

Hence, the size of the voltage vector differs between the angles that are not limited and the angles that are limited, and therefore a torque ripple of a sixth-order component of the electric angular velocity, which appears six times over a single electric angle period, is generated.

Figure 9A:
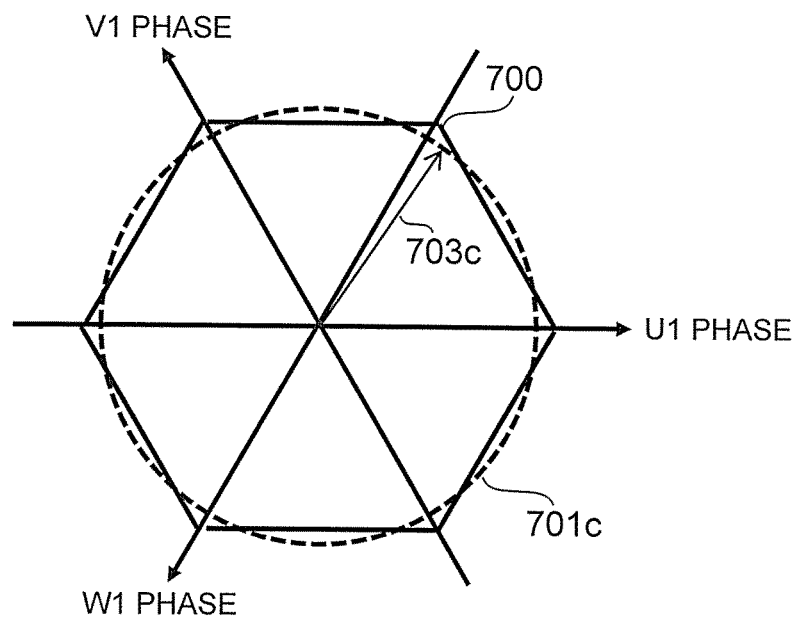
FIGS. 9A and 9B are illustrative views showing voltage vectors of two groups of windings having different phases in the control apparatus for an AC rotary machine according to Embodiment 5 of this invention.
Figure 9B:
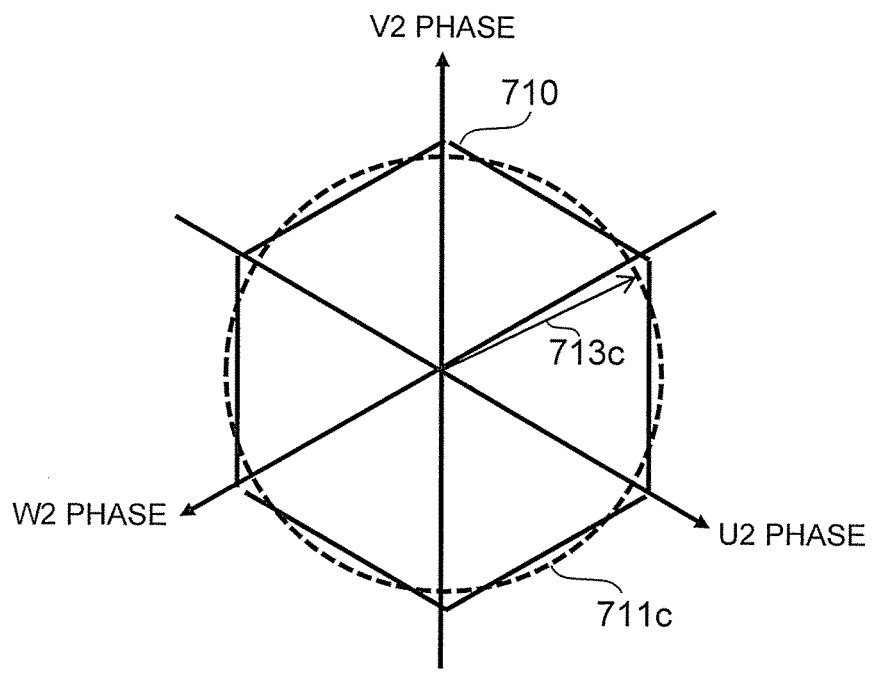

FIGS. 9A and 9B are illustrative views showing voltage vectors of two groups of windings having different phases in the control apparatus for an AC rotary machine according to Embodiment 5 of this invention. Here, a case in which U1, V1, W1 of the first winding group are advanced by a phase of 30° relative to U2, V2, W2 of the second winding group will be described.

In FIGS. 9A and 9B, when an angle formed from the U1 phase is set as φ, a voltage vector 703c of the first winding group is limited by the regular hexagon 700. At this time, the output reaches a minimum at φ=(30+60×n)°, and at φ=(60× n)°, the target voltage vector can be output.

Meanwhile, a voltage vector 713c of the second winding group is limited by a regular hexagon 710. At this time, the output reaches a minimum at ϕ=(60×n)°, and at ϕ=(30+60×n)°, the target voltage vector can be output. As a result, a sum of the voltage vectors of the first winding group and the second winding group cancels out output variation.

Figure 10:
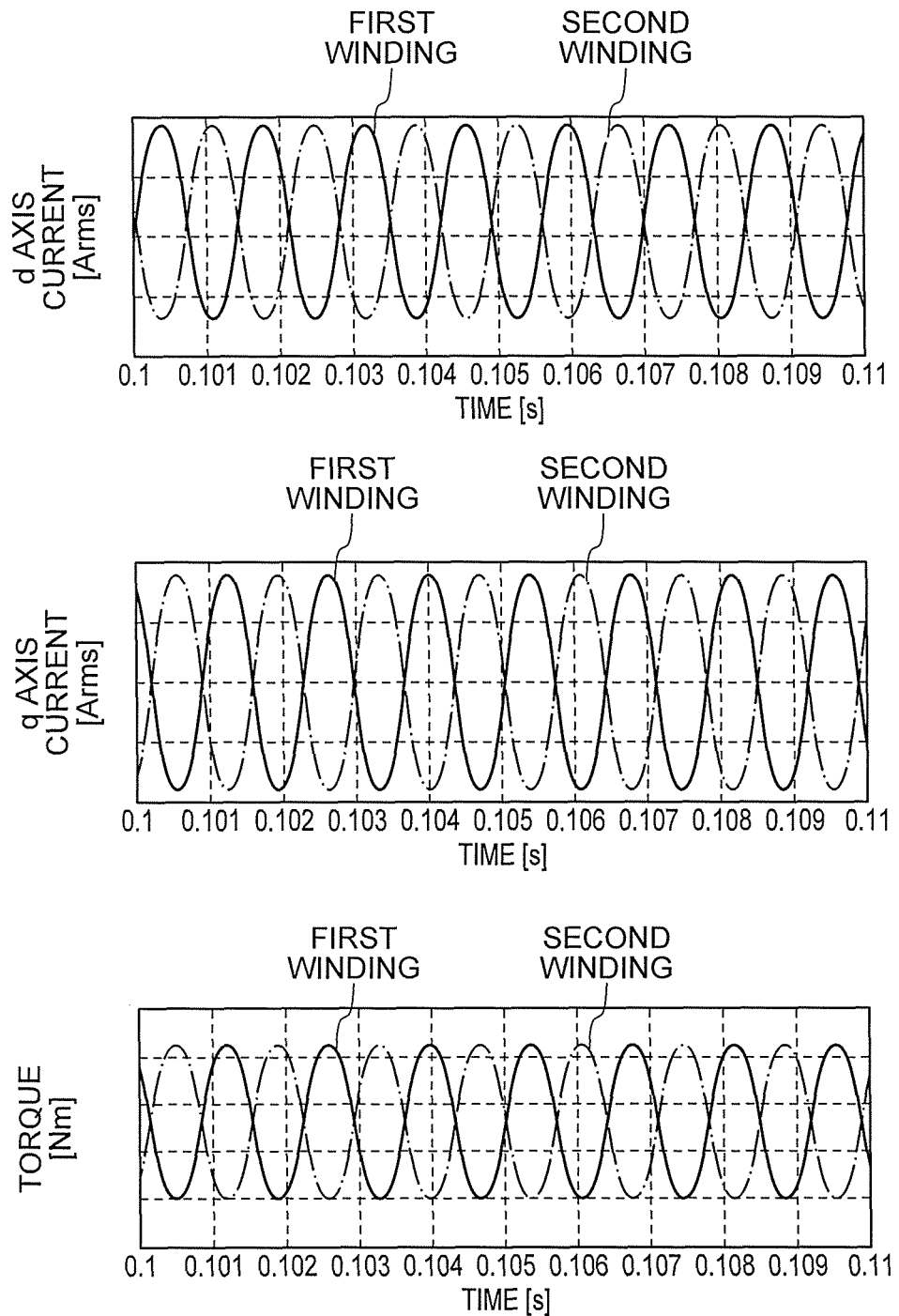
FIG. 10 is an illustrative view showing examples of currents and a torque when a phase difference between a first winding group and a second winding group is set at 30° in the control apparatus for an AC rotary machine according to Embodiment 5 of this invention.

FIG. 10 is an illustrative view showing examples of the currents and the torque when the phase difference between the first winding group and the second winding group is set at 30° in the control apparatus for an AC rotary machine according to Embodiment 5 of this invention. In this calculation example, an electric angle frequency reaches 120 Hz at a modulation factor exceeding 100%, and therefore a 720 Hz ripple appearing at any output of the d axis current, the q axis current, and torque is a ripple of the sixth-order component of the electric angular velocity.

Note that a torque ripple is generated in both the first winding group and the second winding group, but the torque ripple of the first winding group and the torque ripple of the second winding group have opposite phases, and therefore the electric angular velocity sixth-order component torque ripple included in the sum of the output torque of the first winding group and the output torque of the second winding group is reduced by a cancellation effect. Further, in this embodiment, a case in which the phase difference is set at 30° was described, but the phase difference between the first winding group and the second winding group is not limited to 30°.

For example, FIG. 11 is an illustrative view showing examples of the currents and the torque when the phase difference between the first winding group and the second winding group is set at 22.5° in the control apparatus for an AC rotary machine according to Embodiment 5 of this invention. In this calculation example, assuming that the electric angle frequency reaches 120 Hz at a modulation factor exceeding 100%, a 720 Hz torque ripple serving as a ripple of the sixth-order component of the electric angular velocity is generated at any output of the d axis current, the q axis current, and torque, similarly to the above example in which the phase difference is set at 30°.

Here, the torque ripple of the first winding group and the torque ripple of the second winding group have substantially opposite phases, and therefore a cancellation effect is obtained, albeit to a smaller degree than when the phase difference is set at 30°. As a result, the electric angular velocity sixth-order component torque ripple included in the sum of the output torque of the first winding group and the output torque of the second winding group is reduced.

Furthermore, when the voltage vector is moved around respective circumferences of a circle 701c and a circle 711c in FIG. 9, the electric angular velocity sixth-order component torque ripple has a substantially equal magnitude. As shown in FIG. 3, when the torque commands are used up to the saturation voltage in both winding groups in a case where voltage saturation occurs in one of the winding groups due to the effect of a dimension difference between the first winding group and the second winding group, the electric angular velocity sixth-order component of the torque ripple in the first winding group and the electric angular velocity sixth-order component of the torque ripple in the second winding group have identical magnitudes and opposite phases, and therefore the electric angular velocity sixth-order component torque ripple included in the sum of the output torque of the first winding group and the output torque of the second winding group can be reduced by a cancellation effect.

Embodiment 6

In Embodiment 1, described above, the gain of the d axis component of the differential current on the rotational two-axis coordinate system is reduced in the voltage saturation region, but in response to target value variation in the vicinity of a control response frequency, the d axis differential current may or may not follow the target, and therefore the d axis differential current may transit between the condition shown in FIG. 2 and the condition shown in FIG. 3, resulting in generation of a torque ripple.

Further, the condition shown in FIG. 2 is established in response to target value variation at a lower frequency than the control response frequency, and as a result, an output torque improvement effect is not obtained. Hence, in Embodiment 6 of this invention, a case in which the gain of the d axis component of the differential current on the rotational two-axis coordinate system is set at zero in the voltage saturation region will be described.

Figure 12:
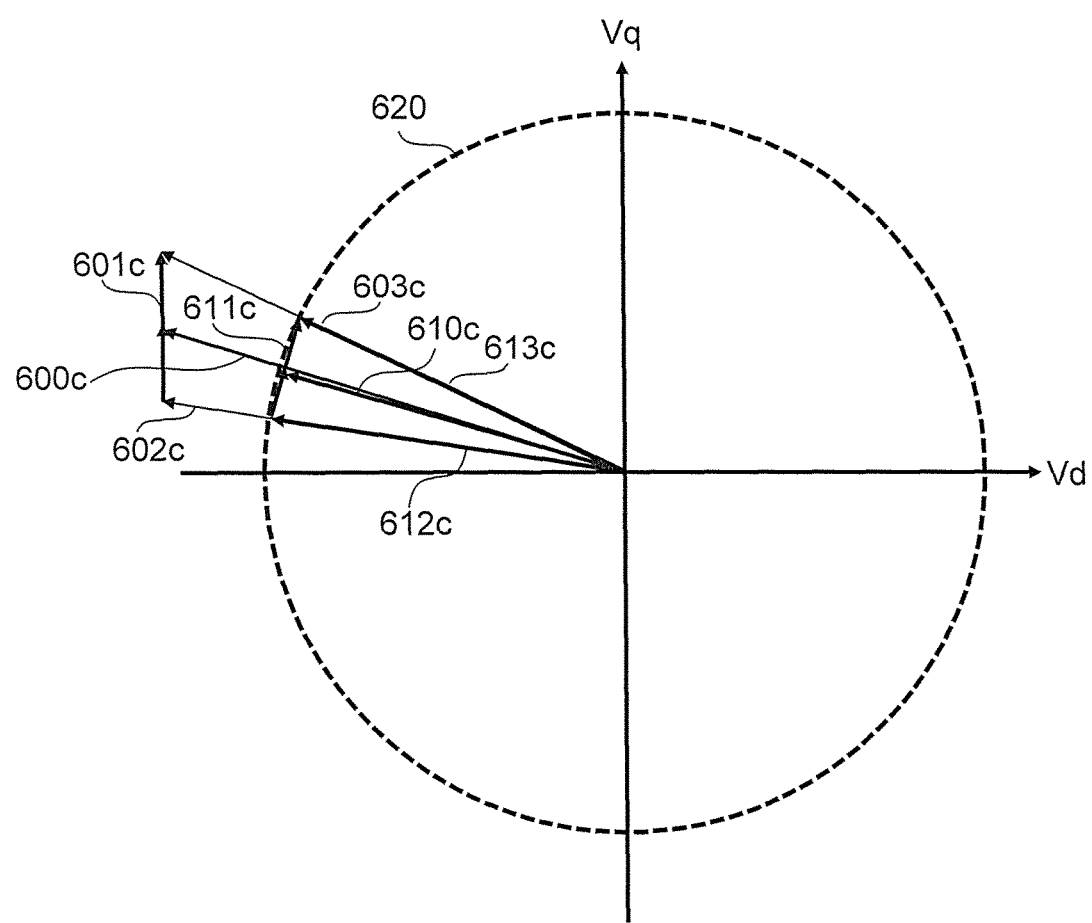
FIG. 12 is an illustrative view showing voltage vectors of respective groups of windings in a control apparatus for an AC rotary machine according to Embodiment 6 of this invention.

FIG. 12 is an illustrative view showing voltage vectors of respective groups of windings in a control apparatus for an AC rotary machine according to Embodiment 6 of this invention. In FIG. 12, a vector 600c is an average voltage vector obtained by halving a sum voltage vector obtained by proportional integral control or the like, a vector 601c is a voltage vector obtained by halving a differential voltage vector obtained by proportional integral control or the like, a vector 602c is a voltage vector of the first winding group in which voltage saturation is not taken into account, and a vector 603c is a voltage vector of the second winding group in which voltage saturation is not taken into account.

At this time, in actuality, the voltages are limited by the voltage saturation circle 620, and therefore the first winding group has a voltage vector 612c obtained by shortening the voltage vector 602c while the second winding group has a voltage vector 613c obtained by shortening the voltage vector 603c.

In this embodiment, the differential voltage is considered only in terms of the q axis component, and therefore the d axis differential current does not affect the voltage vector 612c and the voltage vector 613c. Accordingly, the voltage saturation circle 620 can be put to maximum use in both winding groups likewise in response to target value variation at a low frequency.

Hence, the voltage commands can be used up to the saturation voltage in both winding groups even when the voltage is saturated in one winding group due to the effect of the dimension difference between the first winding group and the second winding group, and as a result, the output torque can be improved. Moreover, when a differential voltage is obtained by proportional integral control, voltage vectors are generated as shown in FIG. 12, and therefore a magnitude relationship between the Vq components of the voltage vector 601c and the voltage vector 611c can be aligned. Accordingly, the integral term can be calculated correctly, and as a result, reset windup can be suppressed.

Embodiment 7

In Embodiment 6, described above, the gain of the d axis component of the differential current on the rotational two-axis coordinate system is set at zero in the voltage saturation region, but when an absolute value of the d axis component of the differential voltage vector is considerably larger than an absolute value of the q axis component, or in other words when an angle formed by the Vq axis in FIG. 12 is small, the differential voltage command vector increases, and when the angle formed by the Vq axis overlaps the Vq axis, the differential voltage command vector becomes infinite.

Note that in actuality, an induced voltage component exists during rotation, and therefore the angle formed by the Vq axis does not overlap the Vq axis in the voltage saturation region. However, a problem remains in that it is difficult to design a set magnitude range for the voltage vector. Furthermore, when the d axis differential current is not fed back, a large d axis current may flow through one of the winding groups, leading to demagnetization. Hence, in Embodiment 7 of this invention, a case in which the gain of the q axis component of the differential current on the rotational two-axis coordinate system is set at zero in the voltage saturation region will be described.

Further, although a case in which the gain of the q axis component of the differential current on the rotational two-axis coordinate system is set at zero will be described in this embodiment, a similar effect can be obtained by reducing the gain in response to target value variation at a higher frequency than the control response frequency.

Figure 13:
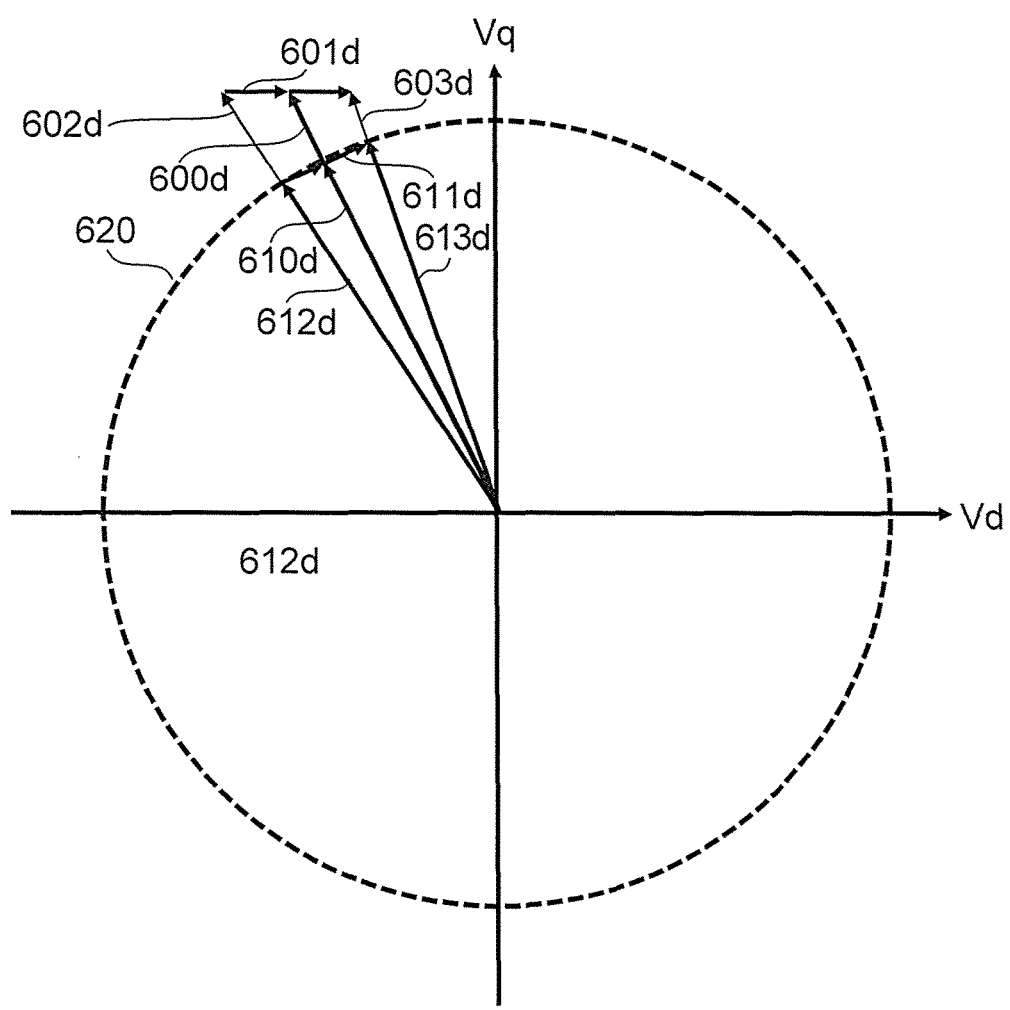
FIG. 13 is an illustrative view showing voltage vectors of respective groups of windings in a control apparatus for an AC rotary machine according to Embodiment 7 of this invention.

FIG. 13 is an illustrative view showing voltage vectors of respective groups of windings in a control apparatus for an AC rotary machine according to Embodiment 7 of this invention. In FIG. 13, a vector 600d is an average voltage vector obtained by halving a sum voltage vector obtained by proportional integral control or the like, a vector 601d is a voltage vector obtained by halving a differential voltage vector obtained by proportional integral control or the like, a vector 602d is a voltage vector of the first winding group in which voltage saturation is not taken into account, and a vector 603d is a voltage vector of the second winding group in which voltage saturation is not taken into account.

At this time, in actuality, the voltages are limited by the voltage saturation circle 620, and therefore the first winding group has a voltage vector 612d obtained by shortening the voltage vector 602d while the second winding group has a voltage vector 613d obtained by shortening the voltage vector 603d.

In this embodiment, the differential voltage is considered only in terms of the d axis component, and therefore the q axis differential current does not affect the voltage vector 612d and the voltage vector 613d. Accordingly, the voltage saturation circle 620 can be put to maximum use in both winding groups likewise in response to target value variation at a low frequency.

Hence, the voltage commands can be used up to the saturation voltage in both winding groups even when the voltage is saturated in one winding group due to the effect of the dimension difference between the first winding group and the second winding group, and as a result, the output torque can be improved. Moreover, when a differential voltage is obtained by proportional integral control, voltage vectors are generated as shown in FIG. 13, and therefore a magnitude relationship between the Vd components of the voltage vector 601d and the voltage vector 611d can be aligned. Accordingly, the integral term can be calculated correctly, and as a result, reset windup can be suppressed.

Embodiment 8

In Embodiment 6 and Embodiment 7, described above, the gain of at least one axis component of the differential current on the rotational two-axis coordinate system is reduced or set at zero in the voltage saturation region, but when a detection error occurs in relation to the current or the angle, the detection error appears as variation in the sum voltage.

Further, by reducing the gain of the differential current when voltage saturation occurs, the electric angular velocity sixth-order component torque ripple generated due to the dimension difference can be reduced by a cancellation effect, but cannot be eliminated completely. Moreover, when reluctance torque exists, a torque ripple of a twelfth-order component of the electric angular velocity cannot be cancelled out, and therefore remains.

Hence, in Embodiment 8 of this invention, a case in which the gain of one of the axis components of the sum current on the rotational two-axis coordinate system is reduced in the voltage saturation region will be described.

First, the torque generated by the AC rotary machine 1 is expressed by Equation (14), shown below. Note that in Equation (14), T denotes the generated torque.

[Expression 14]

$$T = P_m i_{1q}\{\phi + i_{1d}(L_{1d}-L_{1q})\} + P_m i_{2q}\{\phi + i_{2d}(L_{2d}-L_{2q})\} \quad (14)$$

Here, the current difference between the first winding group and the second winding group is smaller than the average value of the currents of the first winding group and the second winding group, and therefore Equation (14) can be approximated as shown below in Equation (15).

[Expression 15]

$$T \approx \tfrac{1}{2} P_m (i_{1q}+i_{2q})\{2\phi + (i_{1d}+i_{2d})(L_d-L_q)\} \quad (15)$$

By reducing the gain used to calculate the sum voltage in this manner, variation in the sum voltage due to a current detection error or an angle detection error can be suppressed, and as a result, a sum voltage ripple can be reduced. Hence, by reducing the gain of one of the axis components of the sum current on the rotational two-axis coordinate system in the voltage saturation region, a vibration component included in the output torque obtained from Equation (15) can be suppressed.

Note that by applying the control apparatuses for an AC rotary machine according to Embodiment 1 to Embodiment 8, described above, to an electric power steering apparatus, a torque ripple can be suppressed in an electric power steering apparatus that is sensitive to vibration.

The invention claimed is:

1. A control apparatus for an AC rotary machine, which controls an AC rotary machine having a first winding group and a second winding group, comprising:
   a current detection unit that detects a current flowing through the first winding group and a current flowing through the second winding group;
   a sum voltage calculation unit that calculates a sum voltage on a rotational two-axis coordinate system on the basis of a sum current, which is a sum of the current of the first winding group and the current of the second winding group, and a current command for the AC rotary machine;
   a differential voltage calculation unit that calculates a differential voltage on the rotational two-axis coordinate system on the basis of a differential current, which is a difference between the current of the first winding group and the current of the second winding group;
   a first voltage calculation unit that calculates a voltage command for the first winding group on the basis of a sum of the sum voltage and the differential voltage;
   a second voltage calculation unit that calculates a voltage command for the second winding group on the basis of a difference between the sum voltage and the differential voltage; and
   a voltage saturation determination unit that determines whether or not voltage saturation has occurred in the first winding group or the second winding group on the basis of at least one of a voltage and a current relating to the first winding group and the second winding group, and when determination is made that voltage saturation has occurred in the first winding group or the second winding group, generates a voltage saturation determination signal for reducing a gain of at least one axial direction component on the rotational two-axis coordinate system.

2. The control apparatus for an AC rotary machine according to claim 1, wherein a phase difference is provided between the first winding group and the second winding group in order to cancel out a torque ripple of a sixth-order component of an electric angular velocity.

3. The control apparatus for an AC rotary machine according to claim 2, wherein the phase difference between the first winding group and the second winding group is $(30 \pm 60 \times n)°$.

4. The control apparatus for an AC rotary machine according to claim 1, wherein the differential voltage calculation unit reduces a gain of a q axis component on the rotational two-axis coordinate system when voltage saturation occurs.

5. The control apparatus for an AC rotary machine according to claim 1, wherein the differential voltage calculation unit sets the gain of the q axis component on the rotational two-axis coordinate system at zero when voltage saturation occurs.

6. The control apparatus for an AC rotary machine according to claim 1, wherein the differential voltage calculation unit reduces a gain of a d axis component on the rotational two-axis coordinate system when voltage saturation occurs.

7. The control apparatus for an AC rotary machine according to claim 1, wherein the differential voltage calculation unit sets the gain of the d axis component on the rotational two-axis coordinate system at zero when voltage saturation occurs.

8. The control apparatus for an AC rotary machine according to claim 1, wherein the sum voltage calculation unit reduces the gain of the d axis component on the rotational two-axis coordinate system when voltage saturation occurs.

9. The control apparatus for an AC rotary machine according to claim 1, wherein when voltage saturation occurs, the sum voltage calculation unit reduces the gain of the d axis component on the rotational two-axis coordinate system at an identical rate to a rate at which the differential voltage calculation unit reduces the gain of the d axis component.

10. The control apparatus for an AC rotary machine according to claim 1, wherein the sum voltage calculation unit reduces the gain of the d axis component on the rotational two-axis coordinate system when voltage saturation occurs.

11. The control apparatus for an AC rotary machine according to claim 1, wherein when voltage saturation occurs, the sum voltage calculation unit reduces the gain of the q axis component on the rotational two-axis coordinate system at an identical rate to a rate at which the differential voltage calculation unit reduces the gain of the q axis component.

12. The control apparatus for an AC rotary machine according to claim 1, wherein the voltage saturation determination unit generates the voltage saturation determination signal on the basis of the sum voltage.

13. The control apparatus for an AC rotary machine according to claim 1, wherein the voltage saturation determination unit generates the voltage saturation determination signal on the basis of at least one of the voltage command for the first winding group and the voltage command for the second winding group.

14. The control apparatus for an AC rotary machine according to claim 1, wherein the voltage saturation determination unit generates the voltage saturation determination signal on the basis of the sum current and the current command.

15. An electric power steering apparatus comprising the control apparatus for an AC rotary machine according to claim 1.

16. An electric power steering apparatus comprising the control apparatus for an AC rotary machine according to claim 2.

17. An electric power steering apparatus comprising the control apparatus for an AC rotary machine according to claim 3.

18. A control method for an AC rotary machine, which is used to control an AC rotary machine having a first winding group and a second winding group, the method comprising:
a current detection step of detecting a current flowing through the first winding group and a current flowing through the second winding group;
a sum voltage calculation step of calculating a sum voltage on a rotational two-axis coordinate system on the basis of a sum current, which is a sum of the current of the first winding group and the current of the second winding group, and a current command for the AC rotary machine;
a differential voltage calculation step of calculating a differential voltage on the rotational two-axis coordinate system on the basis of a differential current, which is a difference between the current of the first winding group and the current of the second winding group;
a first voltage calculation step of calculating a voltage command for the first winding group on the basis of a sum of the sum voltage and the differential voltage;
a second voltage calculation step of calculating a voltage command for the second winding group on the basis of a difference between the sum voltage and the differential voltage; and
a voltage saturation determination step of determining whether or not voltage saturation has occurred in the first winding group or the second winding group on the basis of at least one of a voltage and a current relating to the first winding group and the second winding group, and when voltage saturation is determined to have occurred in the first winding group or the second winding group, generating a voltage saturation determination signal in order to reduce a gain of at least one axial direction component on the rotational two-axis coordinate system.

* * * * *